Jan. 31, 1950        F. CESEN        2,496,119
TRACTION DEVICE FOR AUTOMOTIVE VEHICLES
Filed March 7, 1946        4 Sheets-Sheet 1
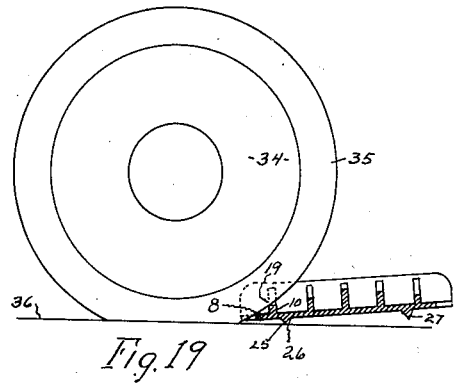
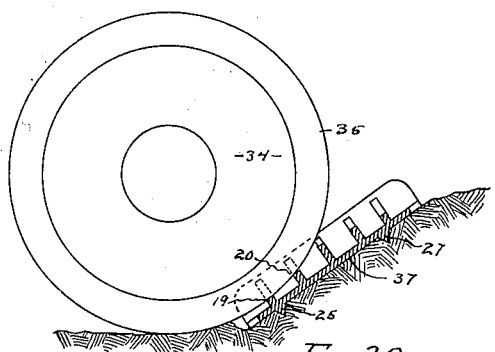
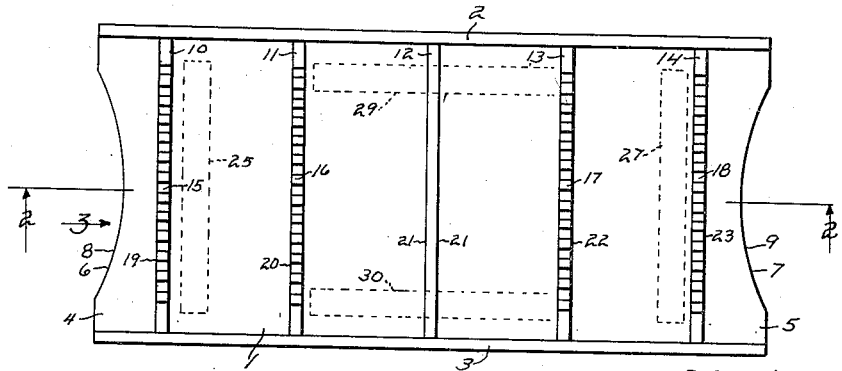
INVENTOR
Frank Cesen
By Harry P. Canfield
ATTORNEY Jan. 31, 1950  F. CESEN  2,496,119
TRACTION DEVICE FOR AUTOMOTIVE VEHICLES
Filed March 7, 1946  4 Sheets-Sheet 2
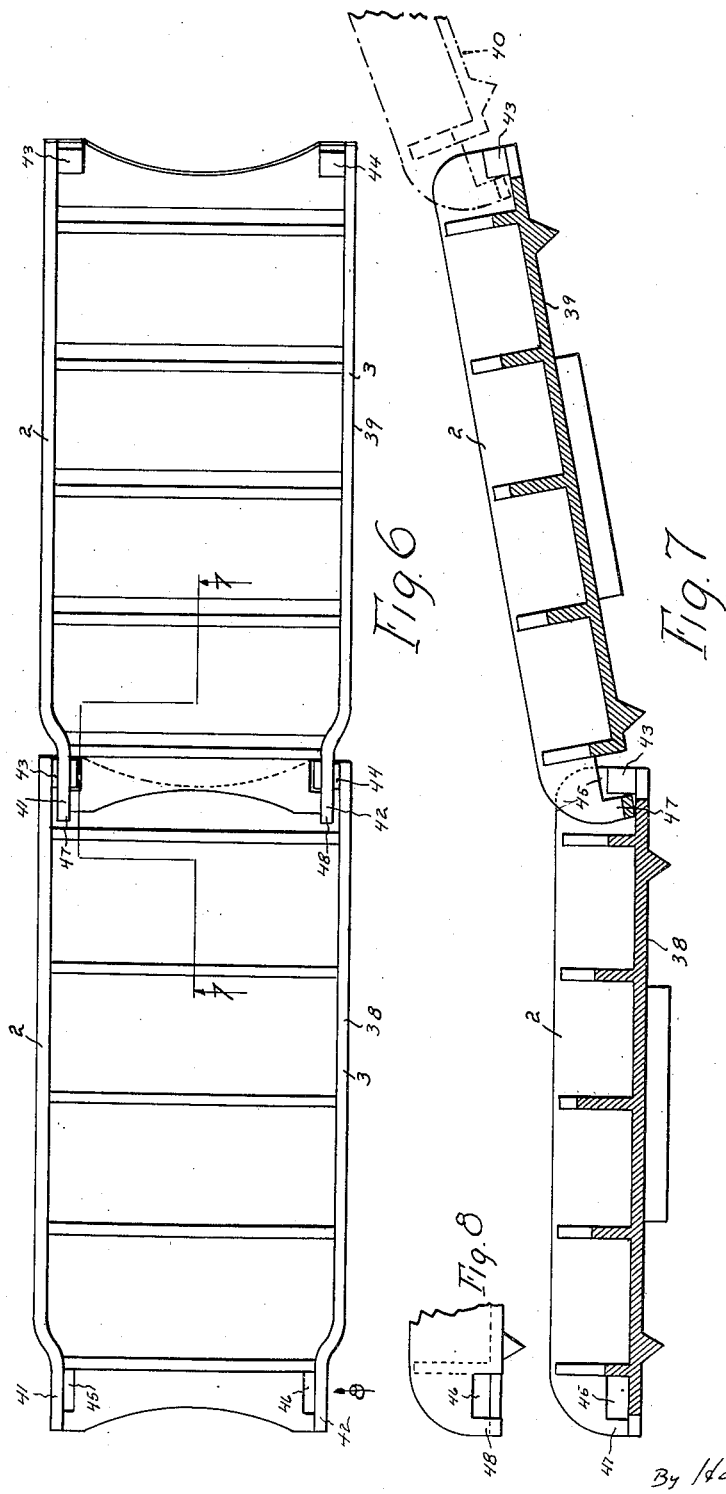
INVENTOR
Frank Cesen
By Harry R. Canfield
ATTORNEY Jan. 31, 1950 F. CESEN 2,496,119
TRACTION DEVICE FOR AUTOMOTIVE VEHICLES
Filed March 7, 1946 4 Sheets-Sheet 3

INVENTOR
Frank Cesen
By Harry P. Canfield
ATTORNEY

Jan. 31, 1950 F. CESEN 2,496,119
TRACTION DEVICE FOR AUTOMOTIVE VEHICLES
Filed March 7, 1946 4 Sheets-Sheet 4
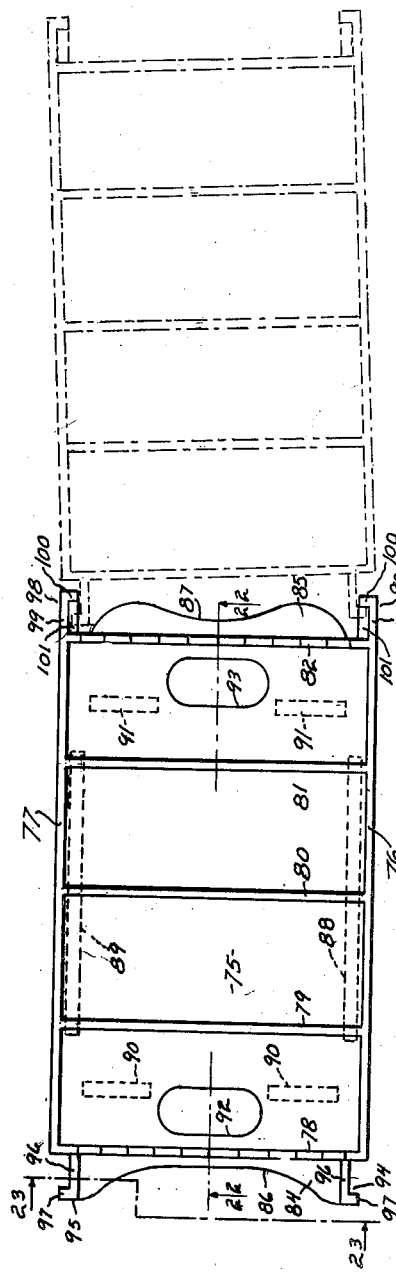
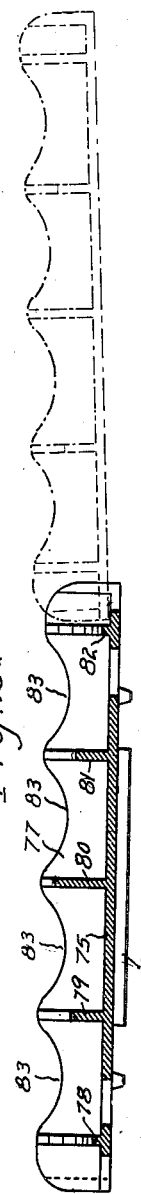
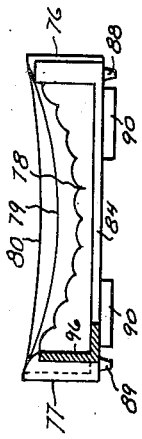
INVENTOR
Frank Cesen
By Harry R. Canfield
ATTORNEY

Patented Jan. 31, 1950

2,496,119

UNITED STATES PATENT OFFICE 2,496,119

TRACTION DEVICE FOR AUTOMOTIVE VEHICLES

Frank Cesen, Cleveland, Ohio

Application March 7, 1946, Serial No. 652,618

12 Claims. (Cl. 238—14)

This invention relates to devices for providing traction for the wheels of automotive vehicles, when stalled because of ice, snow, mud, etc. on the roadway.

Because of the differential gearing commonly provided between the engine and the two drive wheels of an automotive vehicle, if either wheel rests upon a slippery roadway, it may be caused to slip and rotate and prevent propulsion of the vehicle by the other wheel; or if the vehicle is blocked by deep snow or mud the traction required of the driving wheels may be greater than can be developed on the slippery roadway and one or the other of the drive wheels will slip. In either event the vehicle will be stalled unless the traction is artificially increased.

Various devices have been proposed to provide such artificial traction and among these are devices comprising a short piece of trackway which can be carried in the vehicle and when needed may be laid on the roadway in front of the wheel and upon and over which the wheel may roll; and the present invention relates to devices of this type.

Such devices as heretofore proposed have a number of defects which have rendered them impracticable and unsatisfactory.

Among these defects of prior devices are:

That the rounded periphery of the rubber tire of the wheel which must engage and grip and ride up on the device, has contact with the device on only a small point or zone on the tire, insufficient in contact area to develop enough driving traction to start movement of the vehicle unless the tire is first jacked up high enough from the roadway to permit putting the device under the tire;

That lugs or the like provided on prior devices in the attempt to insure traction between the tire and the device likewise do not afford sufficient traction-developing grip with the tire;

That lugs or the like of prior devices as referred to have been designed so that if they give continuous traction they must be so close together, successively, as the tire rolls over them, as to become clogged or filled-over with snow, ice, mud, etc., and so as to render them ineffective unless cleaned out by hand.

That prior devices of this type have had to be of short length to be conveniently stored and carried in the vehicle and often this is not enough to enable the wheels to roll clear of the difficulty and out onto the solid traction developing part of the roadway.

It is among the objects of this invention to provide generally a device of this type in which these and other objections to prior devices are overcome.

Other objects are:

To provide a device of this class of unit length, long enough for ordinary occasions, but which may be quickly and conveniently coupled to other like units to provide a continuous trackway of greater length;

To provide a device of the class referred to having roadway gripping lugs or teeth on its underside to prevent slipping of the device out of position in the use described; and which device when laid upside down presents a flat surface as a base for a vehicle jack; and the said road gripping lugs constitute a fence like retainer to prevent the jack base from slipping off of the device.

Other objects will be apparent to those skilled in the art to which the invention appertains.

The invention is fully disclosed in the following description taken in connection with the accompanying drawing, in which:

Fig. 1 is a top plan view of a device embodying the invention made in a single piece as a metal casting;

Fig. 2 is a longitudinal sectional view from the plane 2—2 of Fig. 1;

Fig. 3 is an end view from the direction of the arrow 3 of Fig. 1;

Fig. 4 is a sectional view from the plane 4—4 of Fig. 2;

Fig. 5 is a bottom plan view of the device of Fig. 1;

Fig. 6 is a top plan view of a plurality of devices similar to that of Fig. 1 but modified to adapt them to be coupled together into a continuous trackway as shown;

Fig. 7 is a longitudinal sectional view from the plane 7—7 of Fig. 6;

Fig. 8 is a fragmentary elevational view taken in the direction of the arrow 8 of Fig. 6;

Figure 9:
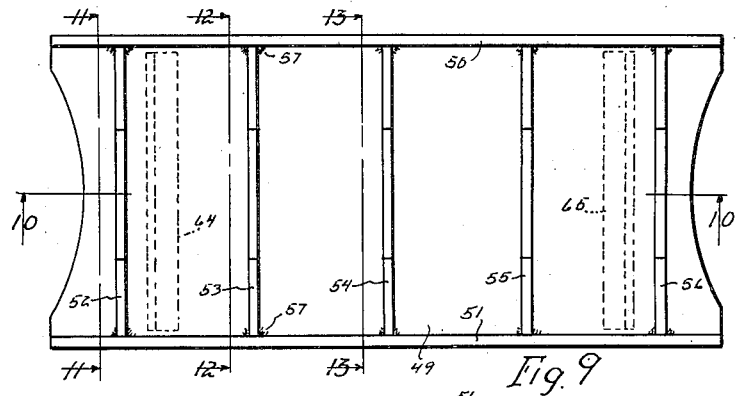
Fig. 9 is a top plan view of another form of the device similar to that of Fig. 1 but as made from sheet metal.
Figure 10:
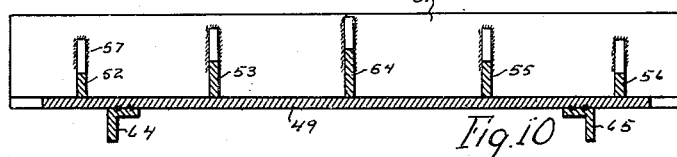
Fig. 10 is a longitudinal sectional view taken from the plane 10—10 of Fig. 9.
Figure 11:
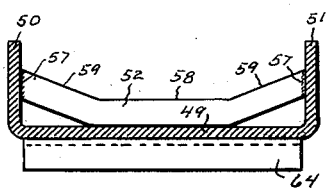
Figure 12:
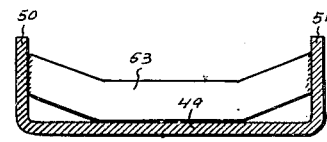
Figure 13:
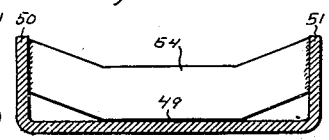
Figure 14:
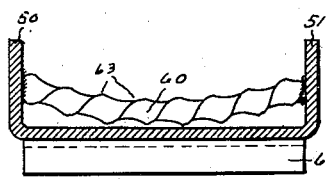
Figure 15:
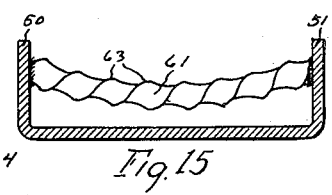
Figure 16:
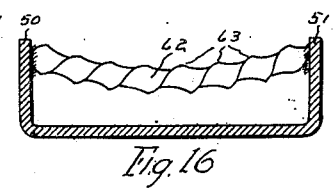
Figure 17:
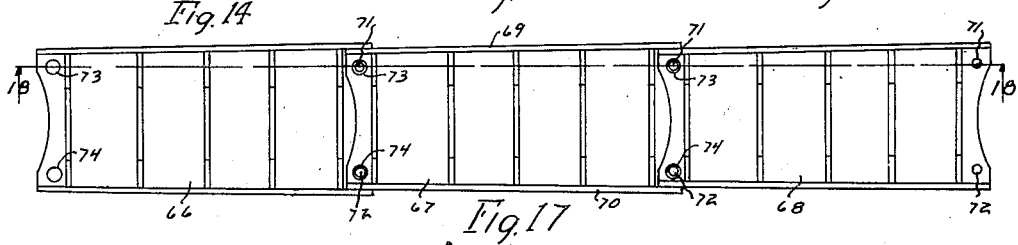
Figure 18:
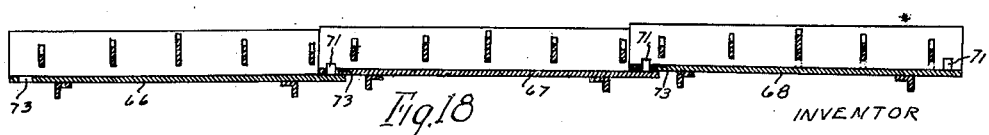

Figs. 11, 12, and 13 are sectional views taken from the planes 11—11, 12—12, and 13—13 respectively of Fig. 9;

Figs. 14, 15, and 16 are views similar to Figs. 11, 12, and 13 respectively, but illustrating a modification;

Fig. 17 is a top plan view of a plurality of devices similar to that of Fig. 9 but modified to adapt them to be coupled together into a continuous trackway as shown;

Fig. 18 is a longitudinal sectional view taken from the plane 18—18 of Fig. 17;

Figs. 19 and 20 are views, somewhat diagrammatic, illustrating the mode of operation of the invention on an obstructed but slippery roadway as in Fig. 19; and on a snow or mud blocked roadway as in Fig. 20;

Fig. 21 is a top plan view showing in solid line, another embodiment of the invention;

Fig. 22 is a sectional view from the plane 22—22 of Fig. 21;

Fig. 23 is a broken sectional view from the plane 23—23 of Fig. 21; and

Figs. 21 and 22 show in broken line how a number of the embodiments of Figs. 21 and 22 may be coupled together longitudinally.

Referring to the drawing, and to the device embodying the invention as in Figs. 1 to 5 inclusive as made in a single piece from cast metal, there is shown at 1 a flat base or elongated bottom, generally rectangular in plan, having side walls 2 and 3 extending upwardly therefrom. As is apparent, the bottom 1 at its opposite ends terminates in edges 4 and 5, and these end edges are cut back or recessed to provide concave arcuate end edge portions 6 and 7 preferably of circular contour; and at the upper side of these arcuate recesses 6 and 7 the metal is formed to provide relatively sharp or angular corner edges 8 and 9.

A plurality such as five fins or fin walls, 10 to 14 inclusive, are cast integral with the bottom 1, extend upwardly therefrom and transversely thereof and join integrally with the side walls 2 and 3. The upper edges of these fins are upwardly concave as indicated in Figs. 3 and 4, and are preferably of circular contour, and these arcuate upper edges are serrated as shown at 15 to 18 for the fins 10, 11, 13, and 14. Preferably all of the fins 10 to 14 inclusive have the said upwardly concave serrated edges but inasmuch as the serrated edges may in some cases if desired be omitted from the central fin 12, they have not been shown in the drawing on that fin.

The arcuate upper edges of the said fins, whether serrated or not are formed so that the arcuate edge has relatively sharp or square corner edges 19 to 23 inclusive for the respective fins.

The said fins 10 to 14 are of different heights, this difference being provided preferably by utilizing different radii for the respective arcuate upper edges. As shown in Fig. 2 and indicated in Fig. 3 the end fins 10 and 14 are the lowest, the fins 11 and 13 are higher than the fins 10 and 14 and the middle fin 12 is the highest of them all, for a purpose to be described.

On the underside of the bottom 1 it has a relatively flat or planar surface 24 and has cast integral therewith sharp edged projections for gripping the roadway and inasmuch as they function as calks they will be referred to as such. There is a transverse calk 25 near one end of the device having a downwardly sharp edge 26; and a similar transverse calk 27 having a similar sharp edge 28, these calks extending transversely across the device as shown in Fig. 1 and indicated in Fig. 3.

The edge 26 of the calk 25 is disposed inwardly of the edge 19 of the fin 10, and evidently the edge 19 is disposed inwardly of the sharp concave edge 8 of the base; and the edge 28 of the calk 27 is disposed similarly with respect to the fin 14.

There are also two longitudinally extending calks 29 and 30 disposed adjacent to the side edges of the base extending downwardly therefrom and having sharp downward edges 31 and 32, see Fig. 4.

As shown in Fig. 5, these four calks 25, 27, 29, and 30 constitute what may be referred to as a fence on the bottom of the device enclosing therewithin a flat surface space 33 for a purpose to be referred to.

In the operation of the device of Figs. 1 to 5, reference may be made to Figs. 19 and 20.

In Fig. 19 an automobile wheel 34 having a rubber tire 35 rests upon a slippery but otherwise unobstructed roadway surface 36. The device as described above is presented to the tire 35 by the operator and in doing so he slides the calk edge 26 along the ground and rocks the device counterclockwise as viewed in the figure until the said sharp corner edges 8 and 19 engage the tire.

These edges because of their concave form embrace the rounded tire 35 and engage it on a considerable angular extent therearound. The device may be forced inwardly so as to make the contact engagement of the tire with the concave edges 8 and 19 a gripping engagement.

Either end of the device may thus be presented to the tire optionally; the corner edges 9 and 23 functioning the same as the said corner edges 8 and 19.

When torque is applied to the wheel in the clockwise direction of Fig. 19, the gripping engagement therewith of the concave sharp corner edge 8 and the concave serrated sharp corner edge 19 develops accordingly great traction, and the wheel rolls up on the first fin 10. The gripping engagement with the first fin 10 is maintained by the serrations thereon and by the concave contour of the fin embracing the tire. The tire will therefore by traction roll successively over this fin and in a similar manner will engage the sharp corner edges and concave serrated edges of the other fins, and roll toward the rear end of the device and ultimately will roll off of its other end and proceed over the roadway.

When the vehicle is stalled by a wheel in deep snow or mud as referred to, the device may be presented to the wheel as shown in Fig. 20. The snow or mud may be scooped out to provide an inclination 37 upon which the device may be placed, and the device is pushed downwardly toward the tire until the sharp serrated corner edge 19 on the fin 10 engages the tire, and preferably also until the concave serrated corner edge 20 on the second fin 11 engages the tire. Both fins embrace the rounded section of the tire as referred to. The traction thus developed will cause the wheel to roll successively over the fins as it climbs up the inclination over the device.

In both the modes of operation of Figs. 19 and 20 the calks 25 and 27 prevent slipping of the device while traction is being developed thereon and the side calks 29 and 30 grip and prevent lateral shifting of the device out of the path of the wheel.

It has been found that when a succession of fins such as those shown from 10 to 14 inclusive are provided to be successively engaged by the tire, they should be close enough together so that when the tire rolls over the one fin it may early in its movement engage the next successive fin to insure continued traction. This indicates that such fins should be placed close together. But it has been found that if they are placed too close together then snow or mud, particularly as in the case of Fig. 20, may fall into the device and fill up the spaces between the adjacent fins and render them ineffective for gripping engagement with the tire. This can be avoided by spacing the fins farther apart; but then they are not close enough together to insure continuous traction in going from one to the other. In the present device, this difficulty has been overcome by making them successively higher toward the middle of the device, so that notwithstanding that they are disposed relatively far apart, to prevent excessive snow and mud collection as referred to the tire upon rolling over one fin makes early engagement with the next one at least until the tire has rolled to the longitudinal middle of the device, after which the momentum gained by the vehicle will reduce the need for artificial traction.

It is contemplated in the practice of the invention that at least two such devices will be stored and carried in the vehicle, because if one slipping wheel is given artificial traction by the device, the other wheel may begin to slip and should likewise be given artificial traction.

Since the driver of the vehicle will have at least one such device in his vehicle at all times, and I have taken advantage of this fact to provide an additional use for the device, namely as a base for a jack to raise the vehicle for ordinary purposes such as changing a wheel or tire.

In this use of the device, it is turned upside down as indicated in Fig. 5 and laid upon the ground; and the jack base is placed upon the flat bottom surface 33, particularly when the ground is soft and the base might sink into the ground, or when the ground is slippery or uneven and the base of the jack might slip laterally. When the base of the jack is placed on the surface 33, the calks surrounding this space in the nature of a fence as referred to, prevents slipping of the jack base on the device even if the device cannot be horizontally placed with the said surface horizontal. In many instances, when a driver attempts to use a jack as referred to, he must hunt around for a flat stone or board to put under the jack base, and such inconvenience is obviated by the use of the above described device as a jack base support.

In some cases, a single unit length of the device, such as that shown in Figs. 1 to 5 may not be sufficient. It may be necessary to provide artificial traction for the vehicle wheel over a greater distance before the wheel will come into contact with a roadway surface on which it will no longer slip.

In Figs. 6, 7, and 8, is illustrated a modification of the device of Figs. 1 to 5 by which a number of said devices may be coupled together to provide a continuous trackway either on level slippery ground or upon an inclined snow or mud bank.

Referring to Figs. 6 to 8, there is shown at 38 and 39 and indicated at 40 three such units having all of the operating features of the single unit above described although the said serrations on the transverse fins have been omitted for the sake of simplification of the drawing, and having the following additional features. At their forward ends, the side walls 2 and 3 are bent inwardly as at 41 and 42 so that the forward ends 41 and 42 of one unit may be placed inside of the side walls 2 and 3 at the rear end of another unit. A pair of lugs 43 and 44 are formed integral with the side walls 2 and 3 respectively and with the bottom 1, and the end portions 41 and 42 are provided on their undersides with the recesses 45 and 46 providing in effect hooks 47 and 48 which may be hooked over the projections 43 and 44 to couple the forward hooked end of one unit with the rearward end of another unit.

Several units interlinked in this manner may be laid along in alignment on level ground or may extend upwardly over an inclination as indicated in Fig. 7. As shown in Fig. 7 also, the recesses 45 and 46 are larger than the projections 43 and 44, and as shown in Fig. 6 the hook ends 47 and 48 are narrower in the overall dimension than the distance between the walls 2 and 3, so that the succession of units may be laid either in a straight line as in Fig. 6, or each unit may be disposed at an angle to the preceding unit, whereby the trackway may follow a curve. It is not deemed necessary to illustrate this in the drawing.

Referring to the form of the invention in Figs. 9 to 13 inclusive, it will be seen that the essential features are the same as those of the first described form. The principal difference is that the device here shown can be fabricated from sheet metal. The base 49 and side walls 50 and 51 are first formed integrally by cutting and bending or press forming operations into a trough-like body. To provide the transverse fins, which in this case are shown at 52 to 56 inclusive, sheet metal pieces are formed and welded at their ends as indicated at 57 to the inner wall of the sides 50 and 51. To provide the upwardly concave edges on the fins the pieces 52 to 56 may first be formed from straight bar stock or cut from sheet metal and then bent into the configuration plainly shown in Figs. 11 to 13. To cause the concave gripping edges of the fins to be successively higher proceeding from the end of the device toward its middle, the stock from which the fins are made may be successively wider as shown in going from Fig. 11 to Fig. 13.

The fins 52 to 56 have been shown without serrated edges as indicating that they in all cases are not essential; but a corresponding tire-gripping effect is provided by the shape of the transverse fins. For example in Fig. 11, the fin 52 is shown as having an intermediate horizontal upper edge portion 58; and at each side thereof inclined portions 59—59. The tire being resilient, will, as it rolls up on the fin 52 yield and engage all three edge portions 58 and 59—59 and thus grip the fin. These edge portions being of different inclination tend to bite into the resilient tire more effectively than if these edges were all disposed on a continuous smooth concave arc, and therefore the different inclinations of these edge portions function to produce generally the same effect as serrations.

When actual serrations are desired in this sheet metal form, they may be provided on the upper edges of the fins of Figs. 11, 12, and 13; but in Figs. 14, 15, and 16, I have shown another way to provide them as a modification. Here the fins are indicated at 60, 61, and 62 as welded at their ends to the side walls 50 and 51 and suspended thereby; and the fins are formed from rectangular or square section bar stock twisted so that the edges of the twisted stock as at 63—63 provide teeth or serrations on the upper sides of the fins. The bars 60, 61, and 62 before being welded, are bent to be concave on their serrated upper sides as shown in the drawing, and each, proceeding from the end of the device is welded on at a higher elevation than the one preceding it to cause the fins to be successively higher as referred to.

To provide the aforesaid calks on the underside of the device, pieces of angle section steel 64 and 65 are welded to the underside of the base 49.

The mode of operation of this form will in its essential respects be the same as that of the first described form.

In Figs. 17 and 18 is shown, to smaller scale, a modification of the sheet metal form of Figs. 9 to 13, by which a number of units may be coupled together to provide an elongated trackway.

The units in this form, three of which are shown at 66, 67, and 68 made like the units of Figs. 9 to 13 have the following differences.

The side walls, of each unit, for example the side walls 69 and 70 of the unit 67 instead of being parallel, as in Fig. 9, are inclined or tapered toward each other so that the forward end of the unit is, in its overall dimension, narrower than its rearward end, whereby the forward end of one unit may be inserted into the rearward end of the unit ahead of it.

At the rearward end of each unit, a pair of posts 71 and 72 are welded to the base of the unit at points adjacent the side walls thereof, and project upwardly therefrom. At the forward end of each unit a pair of perforations 73 and 74 are provided in the base of the unit.

To couple a number of units together, into the relation shown in Figs. 17 and 18, the forward end of one unit is inserted between the side walls of the next unit and the perforations 73 and 74 are telescoped downwardly over the posts 71 and 72 respectively.

The transverse fins of these units may be like those of Figs. 11 to 13 or of those of Figs. 14 to 16 as may be desired, and as will be understood, the type of fins shown in Figs. 11 to 13 being illustrated in Figs. 17 and 18.

The mode of operation of this kind of coupled unit is the same as that described for the coupled units of Figs. 6 and 7.

In Figs. 21 to 23 is illustrated another embodiment of the invention, in general similar to that of Figs. 6, 7, and 8, inasmuch as the device is made from cast metal; and a brief description thereof will suffice.

A flat base or bottom 75 has side walls 76 and 77 between which are fins 78 to 82; the fins being of different heights, those at the end, 78 and 82, being the lowest, the fin 80 at the middle being the highest, and the fins 79 and 81 being of an intermediate height.

The upper edges of these fins are concave as shown in Fig. 23; and the end fins 78 and 82 as shown for the fin 78 in Fig. 23, and indicated in the other figures, is serrated to increase the grip of the vehicle wheel tire therewith as referred to hereinbefore.

The upper edges of the side walls 76 and 77 are serrated having concavities as at 83—83 between pairs of fins; whereby, as will be apparent, when one of the devices is turned upside down and laid upon another like device, for packaging or transportation, they will to a considerable degree nest with each other and occupy less space.

The base 75 extends at its opposite ends beyond the end fins 78 and 82; and as at 84 and 85; and has concave edges 86 and 87 for the tire engaging purposes described hereinbefore.

Longitudinal calks 88 and 89 and transverse calks 90 and 91 are provided similar to those described for Figs. 1 and 2, and for a like purpose, and the transverse calks 90 and 91 may each be in two longitudinally separate parts 90—90 and 91—91; and between the two parts, the base is provided with elongated perforations 92 and 93 functioning as hand holes by which the device may conveniently be picked up.

Except for the detail features mentioned above this form of the device and its functions are substantially the same as those of the device of Figs. 1 and 2, or that of Figs. 6 to 8, but a different means is provided to couple one to another endwise for the purposes referred to hereinbefore.

To this end, at one end of each device, for example the left end of the device as viewed in Figs. 21 and 22, laterally outwardly open hook devices 94 and 95 are provided, L-shape as viewed from above and comprising each a side wall 96 generally parallel to the side walls 76 and 77 of the device, offset inwardly laterally therefrom; and integral with the end fin 78 and with the portion 84 of the base extending beyond the end fin, and having outwardly laterally extending hook portions 97—97.

At the other end of the device hook devices 98—98 are provided, also L-shape in plan, and having hook side walls 99—99 formed by extensions of the side walls 76—77, and having inwardly laterally extending hook portions 100—100; and extensions of the base 75 as at 101—101 integral with the end fin 82 and with hook portions 100—100 and with the hook side walls 99—99 constitute bottoms or floors for the hook devices.

As indicated in Figs. 21 and 22, in broken line, the left end of one unit device may be hooked into the right end of a like unit shown in solid line, to couple one unit to another longitudinally, and this may be repeated for any desired number of units to constitute a trackway of any length for the purposes described hereinbefore.

As will be apparent, to hook one unit to another, the hook device at the left end of one unit is disposed above the hook device at the right end of the other unit and then lowered into the latter.

A vehicle wheel in rolling toward the right over the two such coupled units and in rolling from one to another, will not be able by its weight to uncouple the units because the left hand hook devices rest upon the said floors 101—101 of the right hand hook devices.

The hook devices being of considerable longitudinal extent at both ends of the unit, allows lateral lost motion by which, as shown in Fig. 21, a succession of coupled units may be disposed upon a curve; and as shown in Fig. 22, a series of coupled units may follow an upward inclination; the purposes of which will be clear from the foregoing description of other forms.

The general mode of operation of this construction of unit, and this construction of coupling is the same as that described for the preceding units hereof.

The invention is not limited to the exact constructions and embodiments thereof illustrated and described. Changes and modifications may be made in each of them; and the invention comprehends all such changes and modifications that may be made which come within the scope of the appended claims.

I claim:

1. In a traction device for pneumatically-tired vehicle wheels, an elongated flat base wall having opposite spaced-apart side walls; an end of the base wall being recessed to provide thereon a transverse concave arcuate edge conforming generally to the profile of a vehicle tire tread and the arcuate edge being at substantially right angles to the base; a transverse group gripping calk on the underside of the base wall near the recessed end; a plurality of transverse longitudinally spaced apart fins, projecting upwardly from the base wall and extending to and integrally joined to the side walls and each having an upwardly concave edge conforming generally to the profile of a vehicle tire tread; the concave edge of the end fin nearest the end of the base wall being inwardly of the concave edge on the end of the base wall; and the calk being inwardly of the said end fin; the several fins, proceeding successively from the end fin toward the other end of the base wall having their concave edges successively farther from the base wall.

2. In a traction device for pneumatically-tired vehicle wheels, an elongated base wall having opposite spaced-apart side walls; an end of the base wall being recessed to provide thereon a transverse concave arcuate edge conforming generally to the profile of a vehicle tire tread and the arcuate edge being at substantially right angles to the base; a transverse ground gripping calk on the underside of the base wall near the recessed end; a plurality of transverse longitudinally spaced apart fins, projecting upwardly from the base wall and each having an upwardly concave edge conforming generally to the profile of a vehicle tire tread; the concave edge of the end fin nearest the end of the base wall being inwardly of the concave edge on the end of the base wall; the several fins, proceeding successively from the end fin toward the other end of the base wall having their concave edges successively farther from the base wall.

3. In a traction device for pneumatically-tired vehicle wheels, an elongated base wall having opposite spaced-apart side walls; and end of the base wall being recessed to provide thereon a transverse concave arcuate edge conforming generally to the profile of a vehicle tire and the arcuate edge being at substantially right angles to the base; a transverse ground gripping calk on the underside of the base wall near the recessed end; a plurality of transverse longitudinally spaced apart fins, projecting upwardly from the base wall and each having an upwardly concave edge conforming generally to the profile of a vehicle tire tread; the concave edge of the end fin nearest the end of the base wall being inwardly of the concave edge on the end of the base wall.

4. In a traction device for pneumatically-tired vehicle wheels, an elongated channel-form base; longitudinally spaced, transverse fins projecting upwardly from the channel web, and having upwardly concave upper edges conforming generally to the profile of a vehicle tire tread; a concave recess in an end of the channel web conforming generally to the profile of a vehicle tire tread and the recess having an edge substantially at right angles to the base; the concave upper edges of the fins being successively farther from the channel web proceeding from the recessed end thereof; and a transverse calk on the underside of the channel web near its recessed end.

5. In a traction device for pneumatically-tired vehicle wheels, an elongated channel-form base; longitudinally spaced, transverse fins projecting upwardly from the channel web, and having upwardly concave upper edges conforming generally to the profile of a vehicle tire tread; a concave recess in an end of the channel web conforming generally to the profile of a vehicle tire tread and the recess having an edge substantially at right angles to the base; and a transverse calk on the underside of the channel web near its recessed end.

6. A traction device for pneumatically-tired vehicle wheels comprising an elongated sheet metal channel; a plurality of transverse elements in the channel spaced apart longitudinally of the channel; the transverse elements having upwardly concave edge portions conforming generally to the profile of a vehicle tire tread disposed successively farther from the channel web, proceeding from an end thereof; an end of the channel web having a concave recess therein conforming generally to the profile of a vehicle tire tread and the recess having an edge substantially at right angles to the base; a transverse ground gripping calk of flange-section metal welded to the underside of the web near the recessed end thereof; the said transverse elements comprising bent strips of metal welded at their ends to the channel flanges.

7. A traction device for pneumatically-tired vehicle wheels comprising an elongated sheet metal channel; a plurality of transverse elements in the channel spaced apart longitudinally of the channel; the transverse elements having upwardly concave edge portions conforming generally to the profile of a vehicle tire tread; an end of the channel web having a concave recess therein conforming generally to the profile of a vehicle tire tread and the recess having an edge substantially at right angles to the base; a transverse ground gripping calk of flange-section metal welded to the underside of the web near the recessed end thereof; the said transverse elements comprising bent strips of metal welded at their ends to the channel flanges.

8. A traction device for pneumatically-tired vehicle wheels comprising an elongated sheet metal channel; a plurality of transverse elements in the channel spaced apart longitudinally of the channel; the transverse elements having upwardly concave edge portions conforming generally to the profile of a vehicle tire tread disposed successively farther from the channel web, proceeding from an end thereof; an end of the channel web having a concave recess therein conforming generally to the profile of a vehicle tire tread and the recess having an edge substantially at right angles to the base; a transverse ground gripping calk of flange-section metal welded to the under side of the web near the recessed end thereof; the said transverse elements comprising lengths of bar stock of polygonal section twisted about the longitudinal axis, bent into arcuate form and welded at their ends to the channel flanges.

9. A traction device for pneumatically-tired vehicle wheels comprising an elongated sheet metal channel; a plurality of transverse elements in the channel spaced apart longitudinally of the channel; the transverse elements having upwardly concave edge portions conforming generally to the profile of a vehicle tire tread; an end of the channel web having a concave recess therein conforming generally to the profile of a vehicle tire tread and the recess having an edge substantially at right angles to the base; a transverse ground gripping calk of flange-section metal welded to the underside of the web near the recessed end thereof; the said transverse elements comprising lengths of bar stock of polygonal section twisted about the longitudinal axis, bent into arcuate form and welded at their ends to the channel flanges.

10. In a traction device for vehicle wheels, a generally rectangular unit comprising a channel form base, and a plurality of upwardly concave transverse fins in the channel; projection means at the rectangular corners of the unit at one end, and projection receiving means at the rectangular corners at the other end; the projection means being engageable with the projection receiving means of a like unit, to couple the two units together to form a traction trackway.

11. In a traction device for vehicle wheels, a generally rectangular unit comprising a channel form base, and a plurality of transverse upwardly concave fins in the channel; hooks at the rectangular corners of the unit at one end; hook receptacles at the rectangular corners at the other end; the hooks of the unit being engageable with the hook receptacles of a like unit to couple the units together longitudinally to form a traction trackway.

12. In a traction device for pneumatically-tired vehicle wheels, an elongated base wall having opposite spaced-apart side walls; an end of the base wall being recessed to provide thereon a transverse concave arcuate edge conforming generally to the profile of a vehicle tire tread and the arcuate edge being at substantially right angles to the base formed to provide at the upper side of the edge a sharp corner; a transverse ground gripping calk on the underside of the base wall near the recessed end; a plurality of transverse longitudinally spaced apart fins, projecting upwardly from the base wall and each having an upwardly concave edge conforming generally to the profile of a vehicle tire tread; the concave edge of the end fin nearest the end of the base wall being inwardly of the concave edge on the end of the base wall and formed to provide at the side of the edge a sharp corner; the several fins, proceeding successively from the end fin toward the other end of the base wall having their concave edges successively farther from the base wall.

FRANK CESEN.

REFERENCES CITED

The following references are of record in the file of this patent:

UNITED STATES PATENTS

| Number | Name | Date |
|---|---|---|
| 1,335,546 | Bardon | Mar. 30, 1920 |
| 1,344,238 | Lavallee | June 22, 1920 |
| 1,347,405 | Robbins et al. | July 20, 1920 |
| 1,366,031 | Snow | Jan. 18, 1921 |
| 1,373,042 | Workman | Mar. 29, 1921 |
| 1,400,478 | Deschamps | Dec. 13, 1921 |
| 1,868,942 | Hoffman | July 26, 1932 |